(12) United States Patent
Friedlander et al.

(10) Patent No.: US 8,555,167 B2
(45) Date of Patent: Oct. 8, 2013

(54) INTERACTIVE ACCESS TO MEDIA OR OTHER CONTENT RELATED TO A CURRENTLY VIEWED PROGRAM

(75) Inventors: Steven Friedlander, San Diego, CA (US); Tracy Ho, San Diego, CA (US); Yuko Nishikawa, La Jolla, CA (US); Sabrina Yeh, Laguna Beach, CA (US); Hyehoon Yi, Escondido, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 494 days.

(21) Appl. No.: 12/402,215

(22) Filed: Mar. 11, 2009

(65) Prior Publication Data
US 2010/0235740 A1    Sep. 16, 2010

(51) Int. Cl.
G06F 3/00      (2006.01)
G06F 3/048     (2013.01)
G06F 13/00     (2006.01)
H04N 5/445     (2011.01)

(52) U.S. Cl.
USPC ........... 715/719; 715/768; 715/788; 715/790; 725/43; 725/47

(58) Field of Classification Search
USPC .............. 715/790, 768, 788, 719; 725/43, 47
See application file for complete search history.

(56) References Cited

U.S. PATENT DOCUMENTS

| | | | | |
|---|---|---|---|---|
| 5,847,706 A * | 12/1998 | Kingsley | | 715/788 |
| 2002/0042920 A1 | 4/2002 | Thomas et al. | | |
| 2004/0135819 A1 * | 7/2004 | Maa | | 345/840 |
| 2004/0261037 A1 * | 12/2004 | Ording et al. | | 715/788 |
| 2005/0193350 A1 * | 9/2005 | Ishiguro et al. | | 715/794 |
| 2006/0036963 A1 * | 2/2006 | Taylor | | 715/768 |
| 2007/0091209 A1 | 4/2007 | Kwak | | |
| 2007/0250788 A1 * | 10/2007 | Rigolet | | 715/788 |
| 2008/0066100 A1 | 3/2008 | Brodersen et al. | | |
| 2008/0208839 A1 | 8/2008 | Sheshagiri et al. | | |
| 2009/0083797 A1 * | 3/2009 | Yoon et al. | | 725/43 |
| 2009/0228948 A1 * | 9/2009 | Guarin et al. | | 725/137 |
| 2010/0257560 A1 * | 10/2010 | Fukuda et al. | | 725/40 |
| 2010/0306808 A1 * | 12/2010 | Neumeier et al. | | 725/105 |
| 2011/0078733 A1 * | 3/2011 | Lee | | 725/39 |

FOREIGN PATENT DOCUMENTS

| | | |
|---|---|---|
| JP | 2002-135679 A | 5/2002 |
| JP | 2007-036527 A | 2/2007 |
| KR | 2007-0044304 A | 4/2007 |
| WO | 0152050 A1 | 7/2001 |

OTHER PUBLICATIONS

Appleinsider Staff; "Apple filing depicts Apple TV with iChat widget interface"; Feb. 7, 2008; http://www.appleinsider.com/articles/08/02/07/apple_filing_depicts_apple_tv_with_ichat_widget_interface.html.

(Continued)

*Primary Examiner* — Kieu Vu
*Assistant Examiner* — Aaron Lowenberger
(74) *Attorney, Agent, or Firm* — Haverstock & Owens

(57) ABSTRACT

A method for providing content related to a multimedia program on a display device where currently viewed multimedia programs are monitored so that content related to the currently viewed multimedia program may be retrieved from a content source and displayed on a flexible user interface on the display device upon request by the user, in which the user is able to adjust a size and position of the flexible user interface on the display device.

17 Claims, 5 Drawing Sheets

(56) References Cited

OTHER PUBLICATIONS

Ceccarelli, M.P—Philips Research (NL).; "Metadata for Broadcasting" Feb. 16, 1998; http://www.hitech-projects.com/euprojects/storit/reports/acm9/metadata-broadcasting.htm.

Intel; "Widget Channel: Personalize, enjoy and share your favorite Internet experiences on TV"; Technology Brief.
International Search Report issued Aug. 31, 2010 for corresponding PCT International Application No. PCT/US2010/026936.

* cited by examiner

INTERACTIVE ACCESS TO MEDIA OR OTHER CONTENT RELATED TO A CURRENTLY VIEWED PROGRAM

BACKGROUND

Recent trends in multimedia applications, particularly with television and other broadcasted multimedia, whether on the Internet or over cable or satellite signals, show a move toward more user interactivity, viewability, and personalization/customization. These trends have been made possible with advances in technology with respect to electronic transmission speeds, transmission bandwidth and volume increases, and computer/electronics processing power. Television broadcasts have also become increasingly available through several different media so that many people are able to view television programs and movies either live or on-demand either on a television, a desktop computer, a laptop, a handheld mobile device or any other device capable of displaying multimedia.

Several attempts at providing more user interactivity have included interfaces accessible to viewers that provide information relevant to a user's preferences or "favorites" previously identified or set up by the user. Other applications provide a glut of information that may require users to sift through all available content, both related and unrelated to a user's interests, in order to find content relevant to him or her. Additionally, these interfaces tend to have a static location and size such that they obscure some portion of the screen from the visibility of the user without allowing the user to modify which portion of the screen is obscured.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
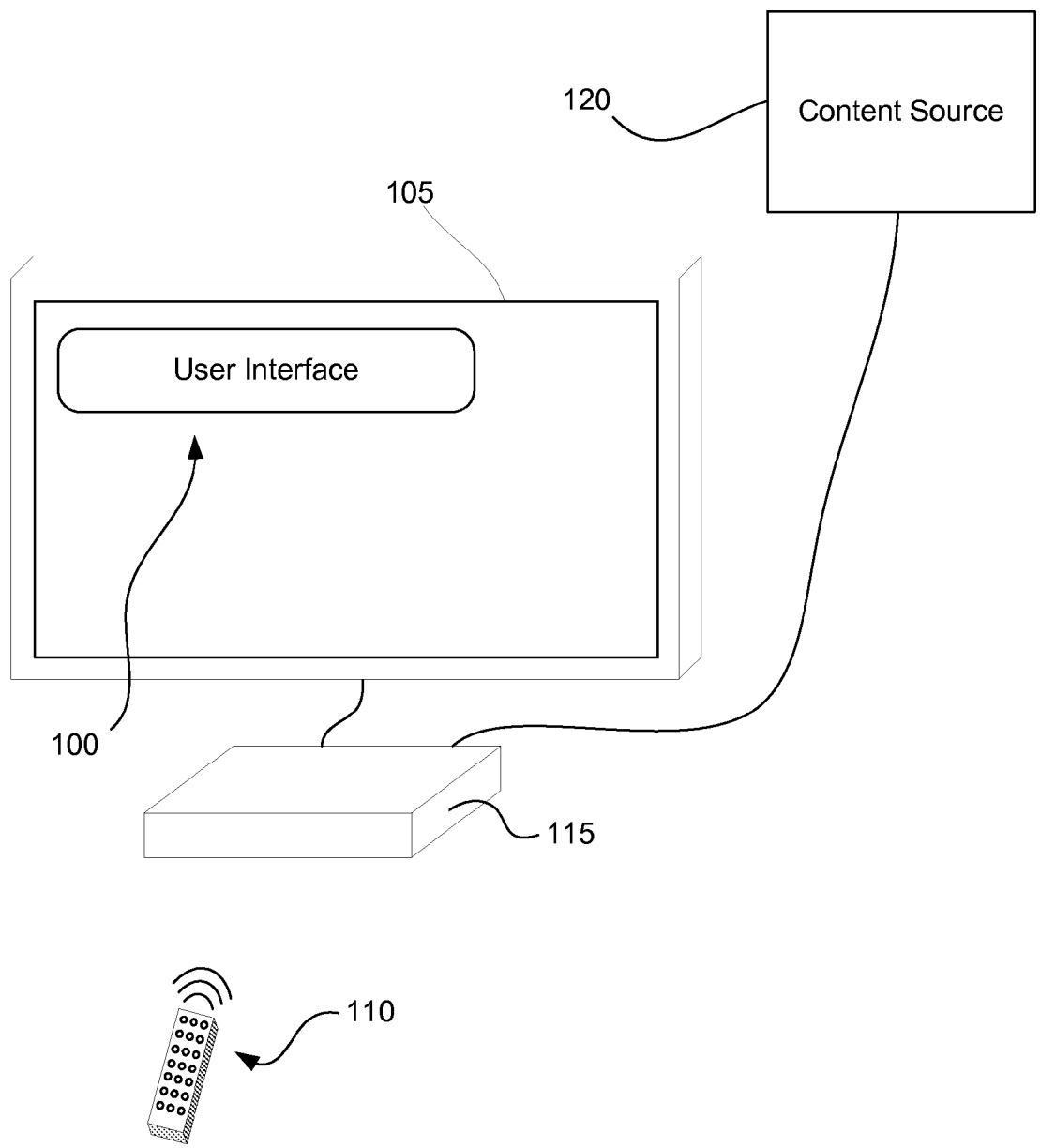
FIG. 1 illustrates an exemplary user interface on a multimedia display device, according to principles described herein.

The present specification discloses systems and methods relating to an interactive user interface for a multimedia display device, particularly in relation to retrieving and displaying content related to a currently viewed multimedia program. An interactive user interface with content related to a user's currently viewed program allows easy user personalization and customization and provides greater accessibility to related programming and relevant information.

As previously mentioned, some systems of the prior art have attempted to provide content which may interest users In some of these systems, in order for a user to receive content relevant to his or her preferences and interests, the user is required to input certain preferences or select "favorites" including specific programs or channels. After inputting the preferences, the systems are then able to provide content related to users' specified interests. In other systems, users receive content without inputting preferences or selecting favorites, but the content includes content both related and unrelated to the user's interests, and the user is required to sort through all of the provided content to find relevant content or information of interest. The system of the present specification is able to provide content about, and related to, a currently viewed multimedia programming without requiring a user to input preferences or select "favorites." In this manner, the present system is able to provide customization which may suit the user and his or her interests based on one or more programs the user has selected to view.

As used herein and in the appended claims, the term "content source" shall be broadly understood to mean any source from which electronic data may be sent to an individual user, including a cable headend or system used by a cable provider to distribute cable television services, a satellite dish receiving a signal from a satellite service provider, an antenna capable of receiving over-the-air programming, the Internet, and any other medium from which multimedia programming and information may be sent to at least one user.

As used herein and in the appended claims, the term "multimedia programming" shall be broadly understood to include television programs, movies, on-demand content, video-on-demand content, any other audiovisual program or content and other forms of entertainment available for users with a television, monitor, projector, screen, computer, personal digital assistant, mobile phone or other similar entertainment or electronic display device.

As used herein and in the appended claims, the term "display device" shall be broadly understood to include any medium through which multimedia programming can be displayed. Some examples may include, but are not limited to, a television, monitor, projector, screen, computer, personal digital assistant, mobile phone or other similar entertainment or electronic display device or any such device that may be connected to a content source.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The embodiment of FIG. 1 shows an interactive user interface ("UI") (100) displayed on a display device (105) according to the present specification. According to one embodiment, the display device (105) may be a television screen, though in other embodiments other display devices may be used. The UI (100) is displayed on the display device (105) to present information at a user's request. The user may send the request by pressing one or more buttons on a remote control device (110).

The UI may be stored on a separate hardware (115) component from the television, such as a digital video recorder. Alternatively, the hardware component (115) may be integrated with the display device (105) or the UI (100) may be integrated with the display device (105). The hardware component (115) may have a built-in hard drive, flash drive or other storage medium for storing multimedia, program data, and/or other electronic content. This allows the user to navigate the UI (100) and select specific programs or content to view or record. The hardware component (115) may also allow a user to store and play other multimedia such as music.

The remote control device (110) may be specifically configured to control both the hardware component (115) and the display device (105). The user may press a button on the remote control device (110) to cause the UI (100) to appear on the display device (105) during a currently viewed multimedia program. Pressing the same button may cause the UI (100) to disappear from the display device (105), or it may change a certain visible aspect of the UI (100), such as the appearance or information contained therein. In the latter instance, repeatedly pressing the same button may cycle through various changes in the appearance or content in the UI until the end of the cycle is reached, at which point the UI (100) will disappear from the display device (105). The remote control device (110) also has additional buttons for effecting various changes to the UI (100), which will be discussed in more detail below.

In the present embodiment, the display device (105) is connected to the hardware component (115), which is connected to a content source (120) for receiving the multimedia programming. Alternatively, the display device (105) may be connected directly to the content source (120). As noted above, the hardware component (115) may be a separate device, as shown in FIG. 1, or its components or functionality may be integrated into the display device (105).

As noted above, the content source (120) may be an antenna, a cable headend, a satellite dish, or the Internet. The Internet may be a particular important source of content because the Internet is so widely available and the use of Internet in providing multimedia content is continually increasing with improved technological capacity and capability. In addition to providing multimedia programming, the content source (120) may also provide additional detailed information about each program, general information about a specific program or station, as well as information deemed to be related to each of the multimedia programs and which may be useful to a user.

Such information may include details about a specific (either current or future) episode of a currently viewed program. The information may also include details about other available programs through a program guide, which may be navigable and updated regularly and stored on the hardware component. Additional information may also be included in the content even if not specifically enumerated in the present specification.

The type and amount of content available to a user may vary depending on the content source (120). In one embodiment including a cable headend as the content source (120), where the television is connected to the cable headend and receives multimedia programming from the cable headend, the content may be limited to that which is provided by the cable system operator to which the user is subscribed. In another embodiment, the display device (105) or hardware component (115) is connected to the Internet in addition to being connected to a cable headend, in which instance more content is available for the user to view and browse from both the cable system and the Internet. Accordingly, the system of the present specification may be used in accordance with a subscription to a cable, satellite, or other content provider and may incorporate information and techniques available in the prior art.

According to one embodiment, the content may be stored at the content source such that it may be sent to the display device (105) or hardware component immediately upon request by the user. In another embodiment, the content may be stored at a different location and retrieved by the content source and then sent to the user's display device (105) or hardware component (115) upon request by the user.

As indicated, the content may include programming information, including details about a specific episode of a currently viewed program, details about future episodes of the same program, details about other available programs, or topical information related to the currently viewed or available programs. The content may also include other information and data not enumerated in the current specification. In one embodiment, the content associated with a multimedia program is included in metadata embedded with the program which is not visible to the user unless requested.

Figure 2:
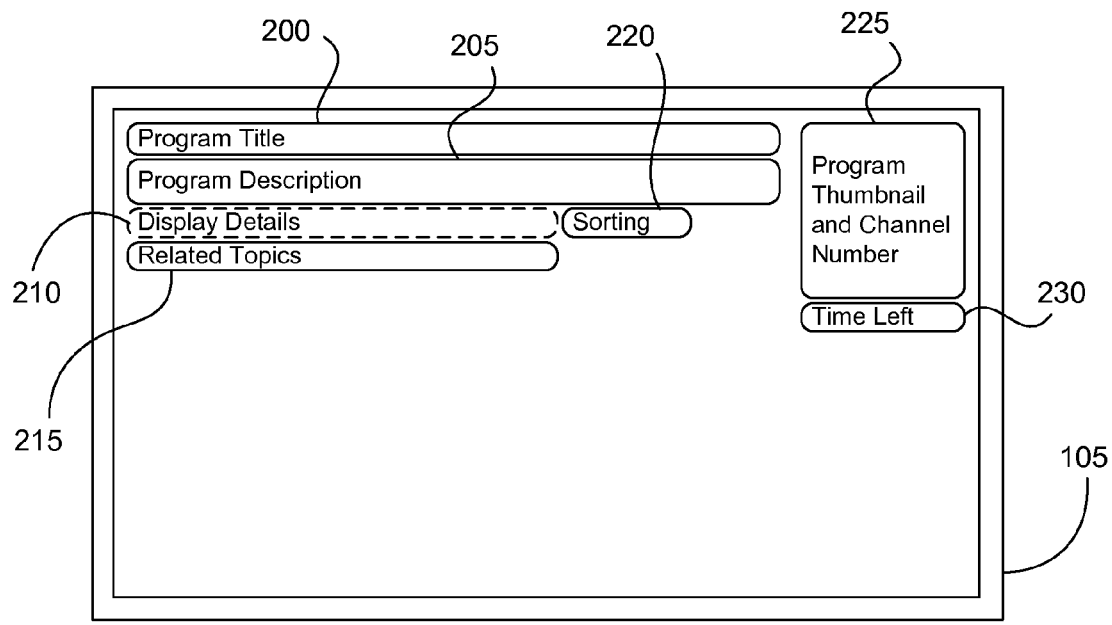
FIG. 2 illustrates an exemplary modular user interface on a multimedia display device connected to a content source, according to principles described herein.

In the embodiment of FIG. 2, the UI (100) has a plurality of individual modules, each displaying a different category of information related to the currently viewed program. In a first or "title" module (200), for example, the title of the program is displayed. A description of the program may be displayed in a separate "description" module (205). The description module (205) may include a synopsis of the currently viewed program, along with producer, actor, or other such information. For movies that are currently being viewed, the information may also include critic ratings (such as the number of stars the program was given by critics). The description module (205) may be larger than the title module in order to allow more content to be displayed.

In a "details" module (210), display details such as screen resolution (e.g., "1080/24p HD"), audio information, program source (e.g., "Antenna," "Cable," or "Satellite"), program rating (e.g., "TV-PG"), and other details may be displayed. In addition, the details module (210) may show whether a program is locked out to viewers who do not have access to view the program.

Topics related to the currently viewed program may be displayed in a "related topics" module (215). The topics may be selected based upon metadata embedded within the program data. For example, a user watching a sporting event may be shown information related to the sporting event or channel currently viewed. The related topics information may include statistics or other information relating to the players, the venue, the sport or some other aspect of the vent.

A "sort" module (220) may allow a user to sort the content based on a variety of methods. For example, the sort module (220) may allow the user to sort content according to the most viewed, "Favorites", television programs only, movies only, related content, or any other sorting method or criteria.

A "channel" module (225) may show a thumbnail view of the currently viewed program, along with the current channel and/or station. The user may also view thumbnails and channel information about related or other available channels or programs in the channel module (225). For programs that do not have a thumbnail available, the channel module (225) may simply display either the channel or station name or both. Upon finding a related channel or program that interests the user, the user may change the channel to the desired program such that the related channel or program is displayed on the display device underlying or without the modules of the UI.

A related program may not be currently broadcast at the time the user is browsing, but the UI (100) may give the user the option to record the program. A "time" module (230) may display the length of the currently viewed program, in addition to indicating how much time is left. This may be accomplished by a bar with an arrow or other indicator to show where the program is currently. For example, for a program that is broadcast or displayed from 10:00 PM to 11:00 PM, the time module (230) may display "10:00 PM" and "11:00" PM on opposite sides of the module, with a time indicator bar in between. As the program advances, the indicator arrow moves along the time indicator bar.

The user may select any of the modules using the remote control device (110). A module may be selected by highlighting the desired module. The user may highlight a specific module by navigating through the modules with the remote control device (110), which may include a directional pad or buttons with arrows indicating directions that the user may move the highlighting. In such a manner, the user is able to move the highlighting up and down or left and right, such that the user may highlight any of the modules displayed on the screen. Once a module is highlighted or selected, the user may perform any of several actions on the module. In one embodiment, each action may be performed by pressing a button whose function is that specific action. In another embodiment, the user may bring up a menu for the highlighted module and select an action from the menu.

The user may also control which modules are included in the UI, selecting only some of the available modules for display when the UI is activated. The user may also control the relative positioning, size and appearance of the selected modules within the UI.

Figure 3:
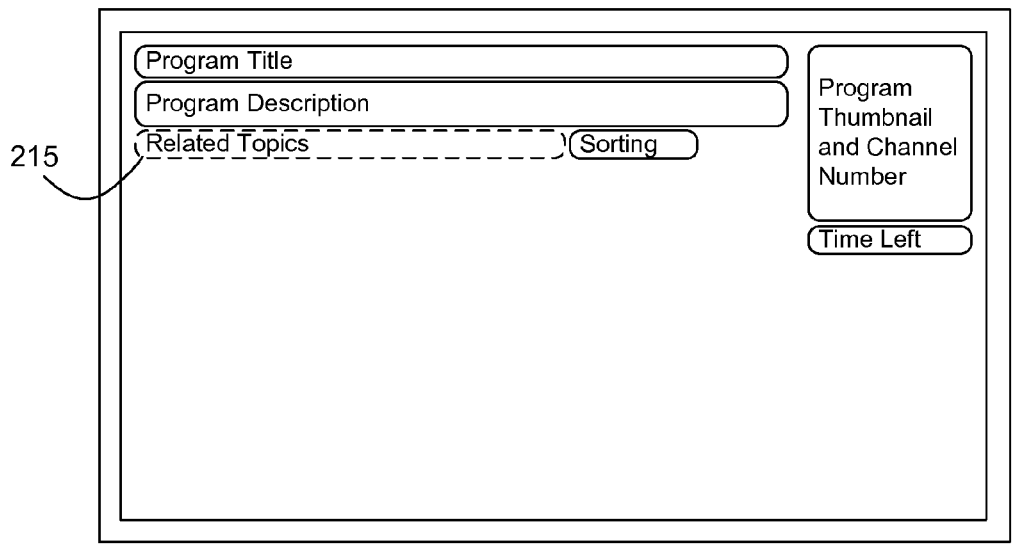
FIG. 3 illustrates an exemplary modular user interface on a multimedia display device, according to principles described herein.

As shown in FIG. 2, the details module (210) has been highlighted (indicated by the dashed line). After highlighting a module, the user may modify the module in a number of ways. In the embodiment of FIG. 3, the details module (210) has been deleted, and the "related topics" module (215) was moved into its place in order to compact the UI (100). The related topics module (215) may also be moved manually to replace the details module (210) or other module which has been removed. Also, after deletion of the details module (210), the UI (100) highlights the related topics module (215) when it replaced the details module (210). Alternatively, the UI (100) may highlight a default module, such as the upper-leftmost module currently on the display device (105)—the title module (200) in this embodiment—or the highlighting may be removed until the user presses a button to select a module.

As indicated, modules may be deleted from or added to the UI (100) by the user at any time. This may be done from a menu having a list of available modules. The modules may be added one at a time, or the user may be able to select a plurality of modules from the list to be added through the use of checkboxes. The menu may also show the modules currently displayed on the screen, which the user may then leave in the UI (100) or deselect to remove from the UI. One or more modules may also be added or removed by pressing a button on the remote control device specifically configured to add or remove a specific module or group of modules.

Figure 4:
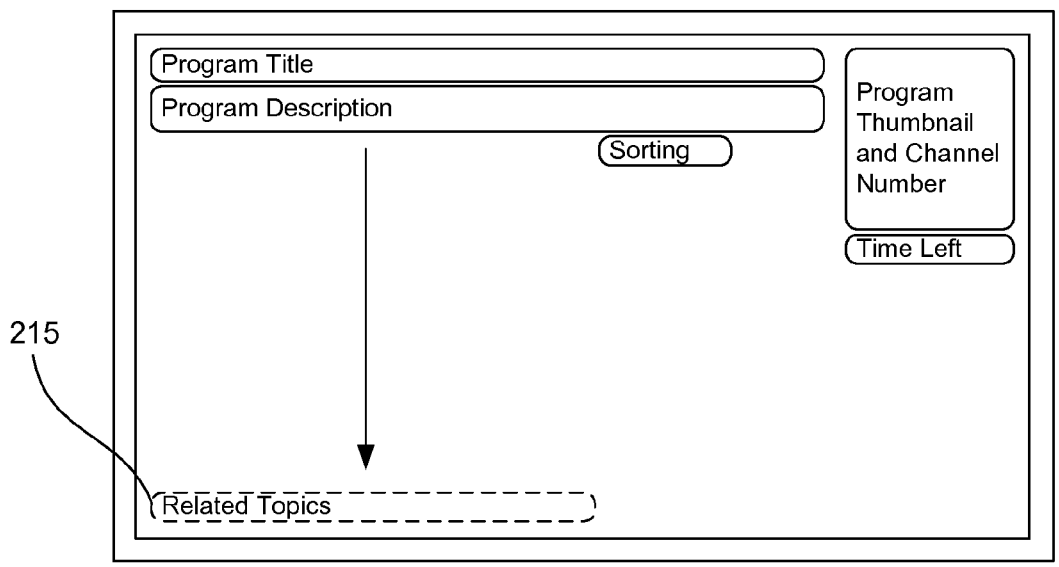
FIG. 4 illustrates an exemplary modular user interface on a multimedia display device, according to principles described herein.

In the embodiment of FIG. 4, the user is able to move individual modules to different areas on the display device (105) independently of the other modules. This may allow the user to customize the UI (100) to his or her preference. Also, a certain multimedia program may have information that the user may want to see while utilizing the UI, but that might initially be covered up by the UI. By allowing the user to move the modules separately, the user may be able to arrange the UI so that specific portions of the currently viewed program are not covered by the UI.

For example, the user may be watching a news program that has a text field or ticker at the bottom of the screen displaying information relevant to a current event, other news stories, weather, stock information, or other information. If the text field is covered up by one or more modules, the user is able to move the modules to a different portion of the screen so that the entire text field is visible. In another example, a user may be viewing a sporting event that displays the score and time remaining at the top of the display device (105). The user may adjust the position of each of the modules so that none of the modules are covering that portion of the screen while the user is utilizing the UI.

The movement of a UI module may be performed with a single press of a button, which allows for quick movement to a predetermined position. Alternatively, the user may select a module and then move it through a series of steps in one or more directions until it reaches a desired position. This method may be used, as indicated above, to identify two or more locations for a module which are then predetermined or pre-set. The user can then toggle the module between these predetermined positions with, for example, the press of single button. This allows for greater customizability.

Adjusting the position may also be done by selecting a specific position in a menu specific to that module. The modules may also be shifted to the left or to the right of the screen according to the user's desired viewing preference. Moving the modules to different areas of the screen may also allow for better readability of each of the modules by creating spacing between them.

The entire UI (100) may also be moved by the user such that the position of all of the modules is changed simultaneously. For example, the user may press a button to change the position of the UI from the top of the screen to the bottom of the screen. The position of each of the modules within the UI may be adjusted to make the UI flush with the bottom of the screen. Moving the entire UI allows for quick adjustment to the display with little effort from the user.

Figure 5:
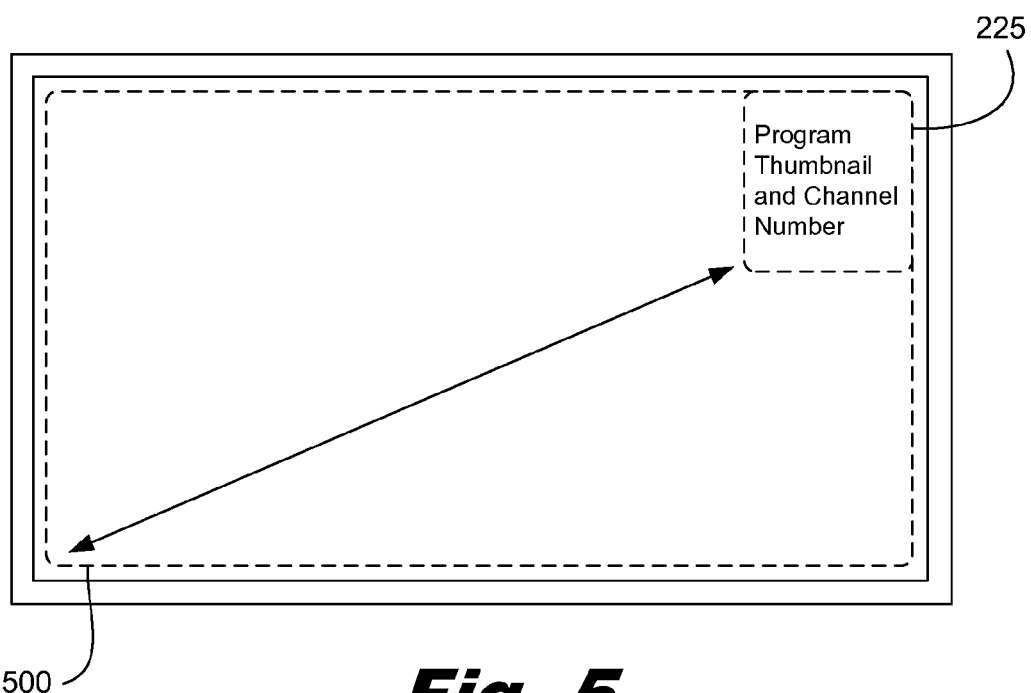
FIG. 5 illustrates an exemplary modular user interface on a multimedia display device, according to principles described herein.

According to the embodiment of FIG. 5, the size of each of the modules may be expanded or shrunk depending on the amount of content in a specific module the user desires to view. For example, the channel module (225) may be expanded to fill all or most of the display device (105), consequently displaying more content than when the module is in its default state. While browsing the channels or programs related to the current program, the user may desire to see more detail about the program, and so expands the module to show the related programming in more detail. Upon expanding, any modules behind the expanded module (500) are covered such that they are not visible.

The expanded module (500) may show a portion of a programming guide that the user may browse through to look at all of the related programming. In addition to showing start and end times of the programs, the expanded module (500) may also show a brief synopsis for each of the related programs. The programming guide may be navigable such that the user is able to select a specific program to see the program information in greater detail, including a brief or expanded synopsis, casting and production information, program rating information or other information, as well as provide options for locking or unlocking the program using a password, recording the program, or removing the program or channel from the related programming. After viewing and/or selecting a related program, the module may be shrunk back to its original size and any other modules that were hidden by the expanded module (500) become visible.

Likewise, other modules may be expanded to show more information with respect to the individual module. The description module (205) may be expanded to show an expanded synopsis of the currently viewed program, as well as additional detail as described above in relation to the channel module (225). The details module (210) may be expanded to show more detail about specific display information regarding the currently viewed program and the display device (105). The expanded details module (210) may also direct a user to a settings menu that will allow the user to change technical settings of the display device, such as for audio preferences, parental locking systems, or other settings. The related topics module (215) may be expanded to show more topics relating to the currently viewed program. The topics may also be displayed in greater detail, particularly if the display device (105) or hardware component (115) is connected to the Internet. In one embodiment, the expanded related topics module (215) may display Internet links for websites for the displayed topics or news headlines and articles on a certain topic. The time module (230) may be expanded such that the time indicator bar is larger and shows more detail. A larger time indicator bar allows a user to more accurately jump to a desired time in the currently viewed program.

The modules may also be shrunk depending on the level of detail the user desires to view. In one embodiment, the UI (100) may be shrunk such that information from some or all of the visible modules is combined and consolidated such that it is displayed in shortened form in a single module. This allows the user to view basic information related to the currently viewed program while the UI is overlaid on as little of the display device (105) as possible.

In one embodiment, the transparency of the UI may be adjusted such that the modules may be opaque, partially transparent, or mostly transparent, so that the currently viewed program is at least partially visible when the UI overlays or overlaps with the currently viewed program. This may be done in a settings menu, such as by expanding the details module, or by pressing a button to bring up a settings menu on the screen. In another embodiment, the UI (100) may be displayed on the display device (105) such that none of the UI (100) is overlaid upon the currently viewed program. This may be possible for a display device when the currently viewed program is not displayed on the entire display device. In such an embodiment, the currently viewed program may be in a "decimated" or "shrunken" mode such that the program is displayed in one section of the display device, such as a corner of the display device, while the UI encompasses the rest of the display device, or at least a portion of the rest of the device. When shrinking the video for the currently viewed program, the video resolution may be modified if desirable. In another embodiment, such as when the display device has a blank portion, the UI is displayed in the blank portion and does not overlap the currently viewed program without shrinking or decimating the video for the currently viewed program.

Modules may include applications or application tools that allow a user to further customize the UI (100). According to one embodiment, a module is an application tool that analyzes text from closed captioning provided with a program and provides keywords for the user derived from the text in the closed captioning. The application tool may be affiliated with a specific program. For example, during a news broadcast about a particular event or person the application may analyze the closed captioning during the broadcast and provide keywords related to the analyzed closed captioning text. The closed captioning may also include information included in scrolling headlines at the bottom of the screen while another event is being discussed on the news broadcast. The user may select one of the keywords to find other news stories related to the keyword.

Figure 6:
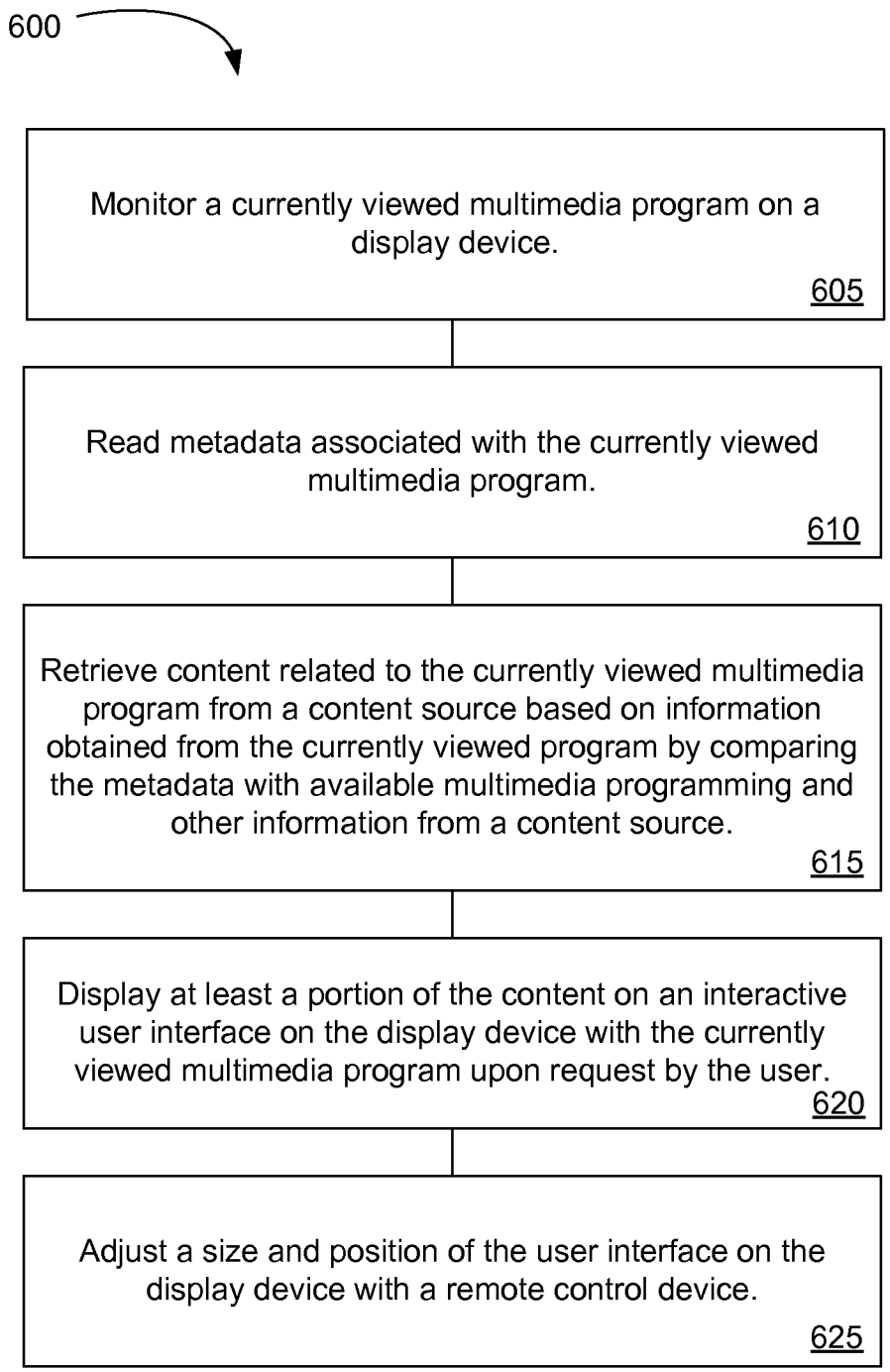
FIG. 6 is a flowchart illustrating an exemplary method for providing content related to a multimedia program on a display device, according to principles described herein.

A method (600) for providing content related to a multimedia program on a display device is shown in the flow chart of FIG. 6. The method is performed through the use of an interactive user interface on the display device. The steps include monitoring (605) a currently viewed multimedia program on a display device. The program may be a live or recorded television program or movie, as well as an on-demand television program or movie or other multimedia program. "On-demand" is used in the present specification to describe programming which may be available at any time the user chooses by selecting the program to watch. On-demand programs may be accompanied by a fee for a single viewing or for viewing multiple times within a predetermined time period.

In one embodiment, the method may include reading (610) metadata associated with the currently viewed multimedia program, such as title, program description, keywords related to the program, or other information. In this manner, the UI may be able to derive relevant content from the signal transmitting the program in order to identify data and content related to the program. After identifying the related content, the UI retrieves (615) content related to the currently viewed multimedia program from a content source based on information obtained from the program by comparing the metadata with available multimedia programming and other content from a content source. The UI is able to filter unrelated content from all the available content at the content source so that only relevant content is retrieved.

After retrieving the related content, the UI displays (620) at least a portion of the content on a display device. The amount and type of content displayed depends on how the user has set up the UI, according to his or her preferences. This may include content such as the title, program description, programs similar to the currently viewed program, keywords derived from the metadata or other means, and other such content.

The user is then able to adjust (625) the size and position of the UI on the display device with a remote control device. As described herein, the UI may be made up of modules that include varying types of content related to the program. The user may be able to add or remove modules according to the specific content the user desires to view. The user may also expand or shrink the modules to display more or less content than is shown by default. Each individual module may be moved to different positions on the display device so that the user may choose which portions of the screen are visible.

Figure 7:
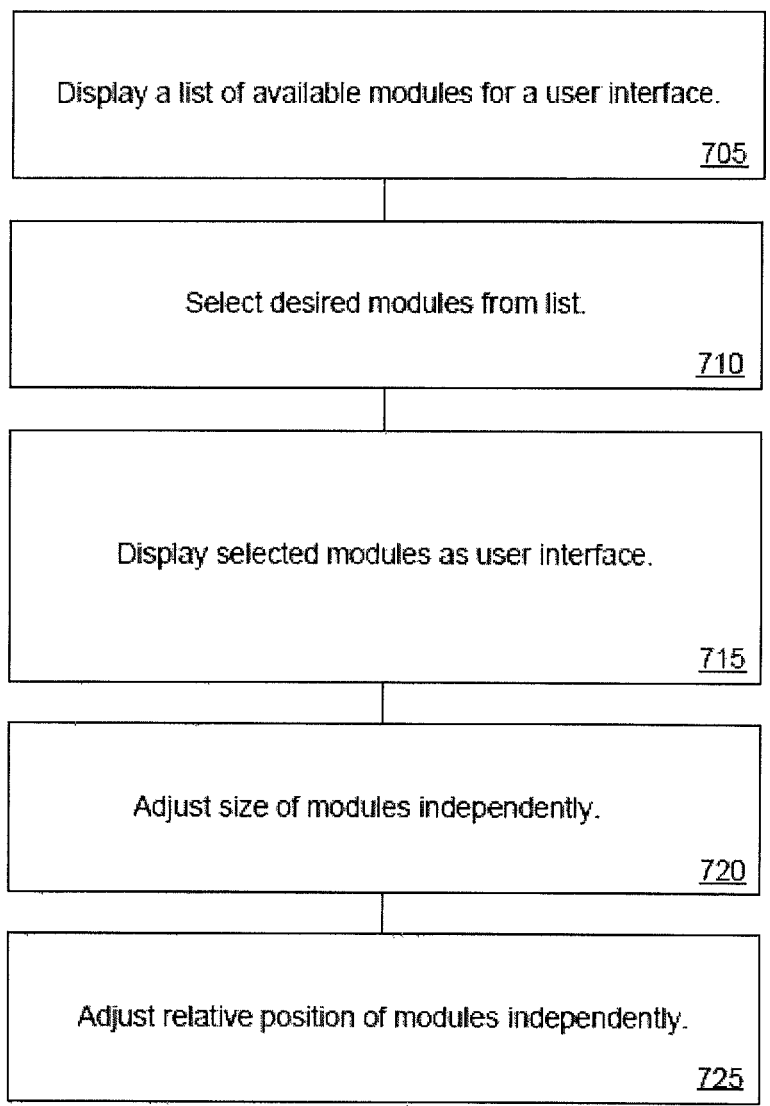
FIG. 7 is a flowchart illustrating an exemplary method for configuring a user interface, according to principles described herein.

FIG. 7 is a flowchart illustrating the configuration of the UI described herein. As shown in FIG. 7, the system may display a list of the modules available for inclusion in the UI (705). The user can then select which of the listed modules should be included in the UI (710). The UI, when displayed, then includes only those modules selected by the user (715).

The user may then, with a remote control or other control device, adjust the size of the modules (720). The size of each module may be adjusted independent of the sizing of the other modules. Alternatively, modules may be grouped and sized in one action.

The user may then, with a remote control or other control device, adjust the position of the modules (725). The position of each module may be adjusted independent of the location of the other modules. Alternatively, modules may be grouped and repositioned in one action.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of providing content related to a multimedia program on a display device, comprising:
   monitoring a currently viewed multimedia program on a display device;
   retrieving content related to said currently viewed multimedia program from a content source based on information obtained from said currently viewed multimedia program; and
   displaying at least a portion of said content on an interactive user interface on said display device upon request by a user viewing said currently viewed multimedia program;
   said user being able to adjust a size and position of said user interface on said display device,
   in which said user interface comprises at least a first and a second module, such that said first and second modules display different content related to said currently viewed multimedia program,
   wherein a transparency of the user interface is adjustable along a sliding scale ranging from opaque to transparent on a per module basis or collective basis,
   wherein said user being able to adjust a size and position of said user interface on said display device includes
      adjusting an amount of said content displayed on said user interface by increasing or decreasing said size of said user interface and
      a group manipulation action where said first and second modules are simultaneously adjusted in size and position,
   wherein said group manipulation action is performed with a single press of a button and permits said user to cycle through a set of group configurations where each group configuration includes different position, size, transparency, and content settings for each module displayed and where an amount of said content displayed on said user interface increases and decreases in accordance with each group configuration, and
   wherein the user interface is automatically not displayed upon completion of said cycling through the set of group configurations.

2. The method of claim 1, in which said content is displayed simultaneously with said currently viewed multimedia program and said user interface overlays at least a portion of said currently viewed multimedia program.

3. The method of claim 1, in which said user interface is positioned on said display device such that said user interface and said currently viewed multimedia program do not overlap.

4. The method of claim 1, further comprising modifying either said size or position of said user interface with a remote control device.

5. The method of claim 1, in which said user is able to select which of said at least first and second modules is displayed on said display device.

6. The method of claim 1, in which said modules of said user interface are separable, such that each of said modules is able to be moved to different positions on said display device independently of other modules.

7. The method of claim 6, in which said user is able to adjust a size of each of said modules with a remote control device.

8. The method of claim 1, in which said content source comprises a cable headend signal.

9. The method of claim 1, in which said content source comprises a satellite dish signal.

10. The method of claim 1, in which said content source comprises an Internet connection.

11. The method of claim 1, in which said user interface comprises at least one application tool that allows said user to select further related content not displayed on said display device.

12. The method of claim 1, wherein said related content comprises other available multimedia programming related to said currently viewed multimedia program, such that said user has an option to view or record said available programming.

13. A multimedia user interface system for providing content related to a currently viewed multimedia program on a display device, comprising:
   a display device for displaying a currently viewed multimedia program, said multimedia program comprising metadata comprising information about said multimedia program;
   an interactive user interface also displayed on said display device; and
   a means for retrieving only content related to said information about said multimedia program from a content source,
   said content being then displayed on said user interface,
   in which said user interface is modular, such that said user interface comprises at least a first and a second module, each of said first and second modules comprising different content related to said multimedia program, and content displayed in each of said first and second modules is able to be modified by a user,
   wherein a transparency of the user interface is adjustable along a sliding scale ranging from opaque to transparent on a per module basis or collective basis,
   wherein said user interface includes a group manipulation action where said first and second modules are simultaneously adjusted in size and position,
   wherein said group manipulation action is performed with a single press of a button and permits said user to cycle through a set of group configurations where each group configuration includes different position, size, transparency, and content settings for each module displayed and where an amount of said content displayed on said user interface increases and decreases in accordance with each group configuration, and
   wherein the user interface is automatically not displayed upon completion of said cycling through the set of group configurations.

14. The system of claim 13, in which a size of said user interface is adjustable, such that an amount of content displayed on said user interface is adjusted by either increasing or decreasing said size of said user interface.

15. The system of claim 13, in which said user is able to further modify content displayed on said user interface by adding or removing modules from said user interface.

16. The system of claim 13, in which said content comprises metadata comprising information about other available multimedia programming determined to be related to said multimedia program.

17. A method of providing content related to a currently viewed multimedia program on a display device, said method comprising:

with a control device, selecting modules for a user interface from among a list of available modules, such that said selected modules are displayed on a display device, each module containing a different type of information, at least some of which is specific to said current viewed multimedia program being shown on said display device; with said control device, adjusting a size or position of any of said modules independent of other said modules on said display device and relative to a currently viewed multimedia program being shown on said display device, wherein a transparency of the user interface is adjustable along a sliding scale ranging from opaque to transparent on a per module basis or collective basis, and wherein said control device includes a group manipulation action where every module displayed on the display device is simultaneously adjusted in size and position, wherein said group manipulation action is performed with a single press of a button and permits said user to cycle through a set of group configurations where each group configuration includes different position, size, transparency, and content settings for each module displayed and where an amount of said content displayed on said user interface increases and decreases in accordance with each group configuration, and wherein the user interface is automatically not displayed upon completion of said cycling through the set of group configurations.

\* \* \* \* \*